United States Patent
Asano

(10) Patent No.: US 6,442,116 B2
(45) Date of Patent: Aug. 27, 2002

(54) INFORMATION REPRODUCTION APPARATUS, INFORMATION RECORDING APPARATUS, AND REFERENCE MARK DETECTION CIRCUIT

(75) Inventor: Kenji Asano, Kakamigahara (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/962,086

(22) Filed: Sep. 26, 2001

Related U.S. Application Data

(62) Division of application No. 09/319,998, filed as application No. PCT/JP97/04743 on Dec. 19, 1997, now Pat. No. 6,377,528.

(30) Foreign Application Priority Data

| Mar. 25, 1997 | (JP) | ................................................ | 9-71493 |
| Mar. 26, 1997 | (JP) | ................................................ | 9-73409 |
| Mar. 27, 1997 | (JP) | ................................................ | 9-75242 |

(51) Int. Cl.$^7$ ................................................ G11B 5/09
(52) U.S. Cl. ................................ 369/47.28; 369/53.34
(58) Field of Search ........................... 369/47.15, 47.23, 369/47.28, 47.35, 47.19, 47.55, 53.31, 53.34, 53.44, 124.04, 124.14

(56) References Cited

U.S. PATENT DOCUMENTS

| 4,464,714 A | 8/1984 | Huijser et al. |
| 5,020,046 A | 5/1991 | Ueda |
| 5,070,492 A | 12/1991 | Ogawa et al. |
| 5,381,397 A | 1/1995 | Okada |
| 5,508,985 A | 4/1996 | Fairchild et al. |

FOREIGN PATENT DOCUMENTS

| EP | 0 793 234 | 2/1997 |
| EP | 0 786 767 A2 | 7/1997 |
| EP | 0 997 893 A1 | 5/2000 |
| JP | 64-1167 | 1/1989 |
| JP | 1-223637 | 9/1989 |
| JP | 01263964 A | 10/1989 |
| JP | 02108282 A | 4/1990 |
| JP | 03119571 A | 5/1991 |
| JP | 04069865 A | 3/1992 |
| JP | 05258379 A | 10/1993 |
| JP | 06060559 A | 3/1994 |
| JP | 06338091 A | 12/1994 |
| JP | 07014311 A | 1/1995 |
| JP | 07093909 A | 4/1995 |
| JP | 08180496 A | 7/1996 |
| JP | 8-339634 | 12/1996 |

*Primary Examiner*—Paul W. Huber
(74) *Attorney, Agent, or Firm*—Armstrong, Westerman & Hattori, LLP

(57) ABSTRACT

Information reproduction apparatus of the present invention is directed to realize data reproduction properly and reliably from an optical disk, including a wobble detection circuit (130) to detect a wobble signal read out by an optical head (500), a PLL circuit (150) to frequency-multiply the wobble signal to generate a synchronizing signal (SS0), a delay circuit (170) delaying a synchronizing signal (SS0) sequentially to generate a plurality of synchronizing signals (SS0–SS10) of different phases, a particular pattern detection circuit (190) to detect a particular pattern in a reproduced signal, and a switching unit (210) to select one synchronizing signal having a phase difference preset by a preset circuit (180) with respect to a detected particular pattern and supplying the selected synchronizing signal to a laser drive circuit (230) and to a signal demodulation circuit (90).

1 Claim, 17 Drawing Sheets

LAND
GROOVE
LAND

FIG. 4A WOBBLE SIGNAL
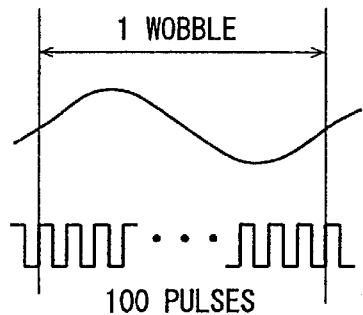
FIG. 4B SS0
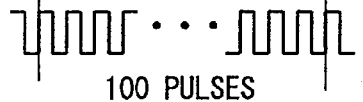
FIG. 5
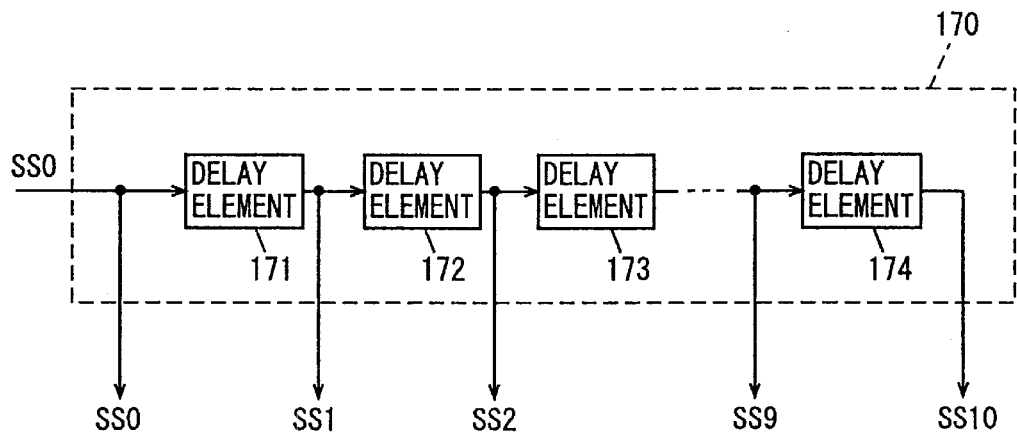

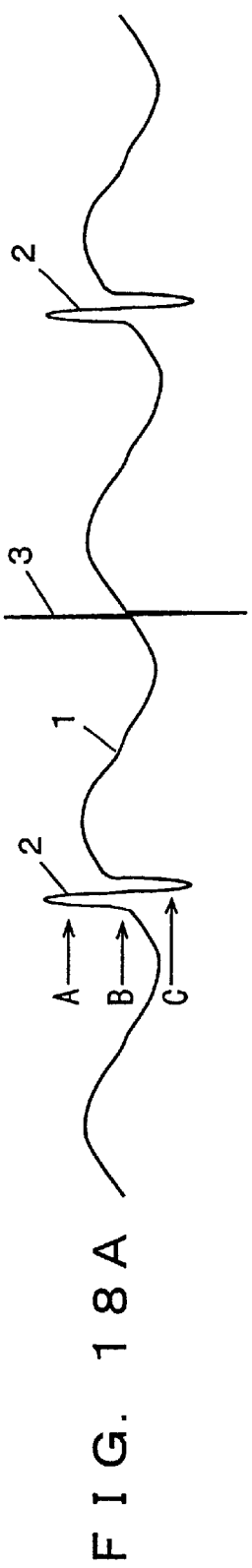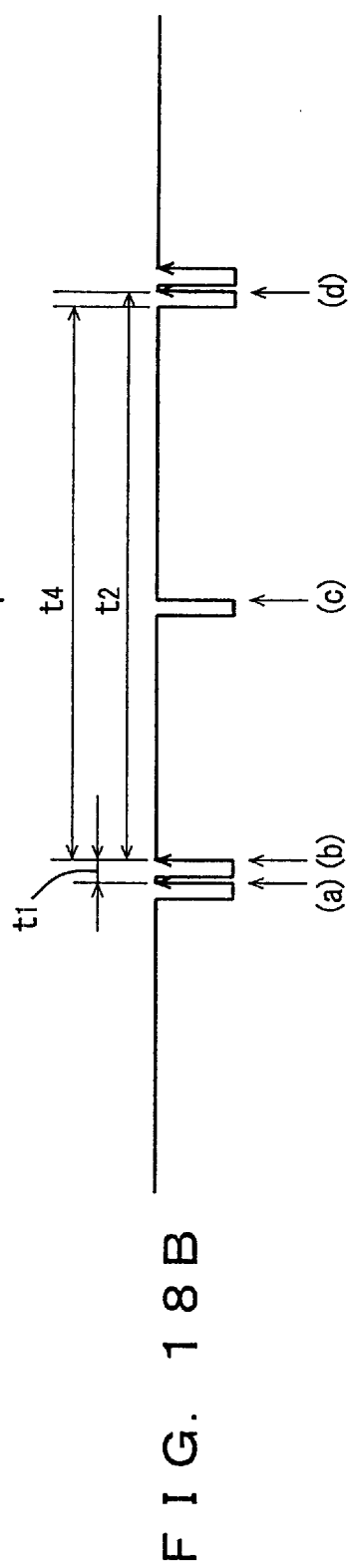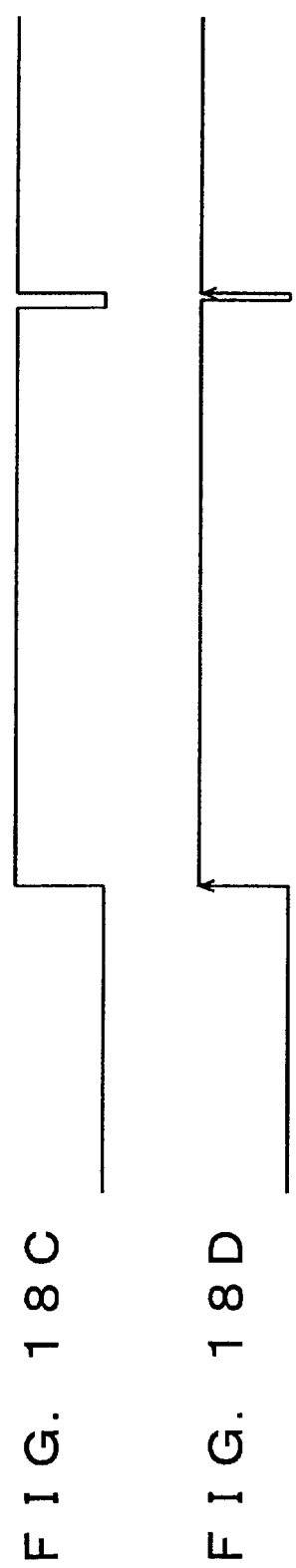
FIG. 18A
FIG. 18B
FIG. 18C
FIG. 18D

INFORMATION REPRODUCTION APPARATUS, INFORMATION RECORDING APPARATUS, AND REFERENCE MARK DETECTION CIRCUIT

This application is a divisional of prior application Ser. No. 09/319,998 filed Jun. 16, 1999, now U.S. Pat. No. 6,377,528, which is a 371 of PCT/JP97/04743 filed Dec. 19, 1997.

TECHNICAL FIELD

The present invention relates to an information recording reproduction apparatus that records information on a magneto-optical recording medium and that reproduces the recorded information from a magneto-optical recording medium.

BACKGROUND ART

The development of a magneto-optical recording medium (referred to as "optical disk" hereinafter) is now intensive together with the recording and reproducing technique since it is a rewritable and reliable recording medium of a large storage capacity.

In a conventional magneto-optical recording reproduction apparatus, a synchronizing signal is prerecorded magnetically at the beginning of every unit of data on an optical disk together with the data. By detecting that synchronizing signal at the time of reproduction for synchronization, the subsequent recorded data can be read out sequentially.

However, when the above-described prerecorded synchronizing signal is missing in the reproduced signal according to the conventional recording/reproduction technique, there was a problem that the appropriate timing to direct a laser beam onto the optical disk for reproduction could not be established, so that data could not be reproduced reliably.

DISCLOSURE OF THE INVENTION

An object of the present invention is to provide an information recording/reproduction apparatus that can realize data reproduction more correctly and reliably.

Another object of the present invention is to provide a reference mark detection circuit that can detect accurately with a simple structure a reference mark such as an address mark (referred to as "fine clock mark" hereinafter) formed together with the wobble at a groove.

According to an aspect, the object of the present invention is achieved by providing an information reproduction apparatus including an information readout circuit responsive to a supplied control signal to read out information from a mounted recording medium, a reproduction circuit demodulating information to generate reproduction data, a first period signal detection circuit detecting a first period signal from the read out information, a synchronizing signal generation circuit generating a plurality of synchronizing signals of different phases according to the detected first period signal, a second period signal detection circuit detecting a second period signal from the read out information, and a control circuit selectively supplying as a control signal to the information read out circuit a synchronizing signal out of the plurality of synchronizing signals generated by the synchronizing signal generation circuit that has a predetermined phase difference with respect to the second period signal detected by the second period signal detection circuit.

According to another aspect, the object of the present invention is achieved by providing an information recording apparatus including a data record circuit responsive to a supplied control signal to record data on a mounted recording medium, an information read out circuit for reading out information from a recording medium, a first period signal detection circuit detecting a first period signal out of the read out information, a synchronizing signal generation circuit generating a plurality of synchronizing signals of different phases according to the detected first period signal, a second period signal detection circuit detecting a second period signal from the read out information, and a control circuit selectively supplying to the data record circuit as the control signal a synchronizing signal out of the plurality of synchronizing signals generated by the synchronizing signal generation circuit that has a predetermined phase difference from the second period signal detected by the second period signal detection circuit.

According to an aspect, another object of the present invention is achieved by providing a reference mark detection circuit that detects a reference mark from a recording medium in which the plane configuration of at least one sidewall of a groove for tracking is formed so that a reference mark having a relatively abrupt second waveform of an amplitude identical to that of a relatively gentle first waveform modulated by a predetermined information signal is overlapped at a constant interval on the first waveform. The reference mark detection circuit includes a circuit generating an electrical signal having a waveform corresponding to the plane configuration of the sidewall, a circuit comparing the level of the generated electrical signal with a predetermined reference level to generate a first logic signal of a first pulse having a first duration time indicating the comparison result between the first waveform and the reference level and a second pulse having a second duration time indicating the comparison result between the second waveform and the reference level, a circuit generating a second logic signal of a third pulse having a fixed third duration time in synchronization with a leading edge of each pulse of the first logic signal, and a circuit latching the logic level of the second logic signal in synchronization with a trailing edge of each pulse of the first logic signal to output the result as a detection result of a reference mark. The third duration time is longer than the second duration time and shorter than the first duration time.

According to another aspect, another object of the present invention is achieved by providing a reference mark detection circuit that detects a reference mark from a recording medium in which the plane configuration of at least one sidewall of a groove for tracking is formed so that a reference mark having a relatively abrupt second waveform of an amplitude greater than that of a relatively gentle first waveform modulated by a predetermined information signal is overlapped at a constant interval on the first waveform. The reference mark detection circuit includes a circuit generating an electrical signal having a waveform corresponding to the plane configuration of the sidewall, a circuit comparing the level of the generated electrical signal with a first reference level that is between the peak value of the first waveform and the peak value of the second waveform to generate a first logic signal of a first pulse indicating the comparison result between the second waveform and the first reference level, a circuit comparing the level of the generated electrical signal with a second reference level that is smaller than the peak value of the first waveform to generate a second logic signal of a second pulse indicating the comparison result between the first waveform and the second reference level and a third pulse indicating the comparison result between the second waveform and the second reference level, and a circuit providing as a detection result of a reference mark a third logic signal of a fourth pulse having a leading edge in synchronization with the leading edge of the first pulse of the first logic signal and a trailing edge according to the first transition of the second logic signal subsequent to the leading edge of the first pulse.

According to a further aspect, another object of the present invention is achieved by providing a reference mark detection circuit that detects a reference mark from a recording medium in which the plane configuration of at least one sidewall of a groove for tracking is formed so that a reference mark having a relatively abrupt second waveform of an amplitude greater than that of a relatively gentle first waveform modulated by a predetermined information signal is overlapped at a constant interval on the first waveform. The reference mark detection circuit includes a circuit generating an electrical signal having a waveform corresponding to the plane configuration of the sidewall, a circuit comparing the level of the generated electrical signal with a first reference level between the peak value in the positive direction of the first waveform and the peak value in the positive direction of the second waveform to generate a first logic signal of a first pulse indicating the comparison result between the second waveform and the first reference level, a circuit comparing the level of the generated electrical signal with a second reference level that is between the peak value in the positive direction and the peak value in the negative direction of the first waveform to generate a second logic signal of a second pulse indicating the comparison result between the first waveform and the second reference level and a third pulse indicating the comparison result between the second waveform and the second reference level, a circuit comparing the level of the generated electrical signal with a third reference level between the peak value in the negative direction of the first waveform and the peak value in the negative direction of the second waveform to generate a third logic signal of a fourth pulse indicating the comparison result between the second waveform and the third reference level, a circuit generating a fourth logic signal of a fifth pulse having a leading edge in synchronization with the leading edge of the first pulse of the first logic signal and a trailing edge according to the first transition of the second logic signal subsequent to the leading edge of the first pulse, a circuit generating a fifth logic signal of a sixth pulse having a leading edge in synchronization with the leading edge of the fourth pulse of the third logic signal and a trailing edge according to the first transition of the second logic signal subsequent to the leading edge of the fourth pulse, a circuit ANDing the fourth logic signal and the fifth logic signal, and a circuit receiving the AND to generate a pulse having a predetermined duration in synchronization with respective trailing edges of the fifth and sixth pulses to output the pulse as a detection result of a reference mark. The predetermined duration is longer than the time interval between the trailing edge of the fifth else and the trailing edge of the sixth pulse.

An advantage of the present invention is that data can be recorded correctly and reliably on a recording medium and data can be reproduced therefrom.

Another advantage of the present invention is that, when an address mark is formed at a groove of a recording medium together with a wobble, the address mark can be detected at high accuracy with a simple structure.

BRIEF DESCRIPTION OF DRAWINGS

FIGS. 4A and 4B are timing charts for describing an operation of the PLL circuit of FIG. 1;

FIG. 5 is a block diagram showing a structure of the delay circuit of FIG. 1;

FIGS. 18A–18D are timing charts for describing an operation of the address mark detection circuit of FIG. 17.

BEST MODE FOR CARRYING OUT THE INVENTION

Figure 1:
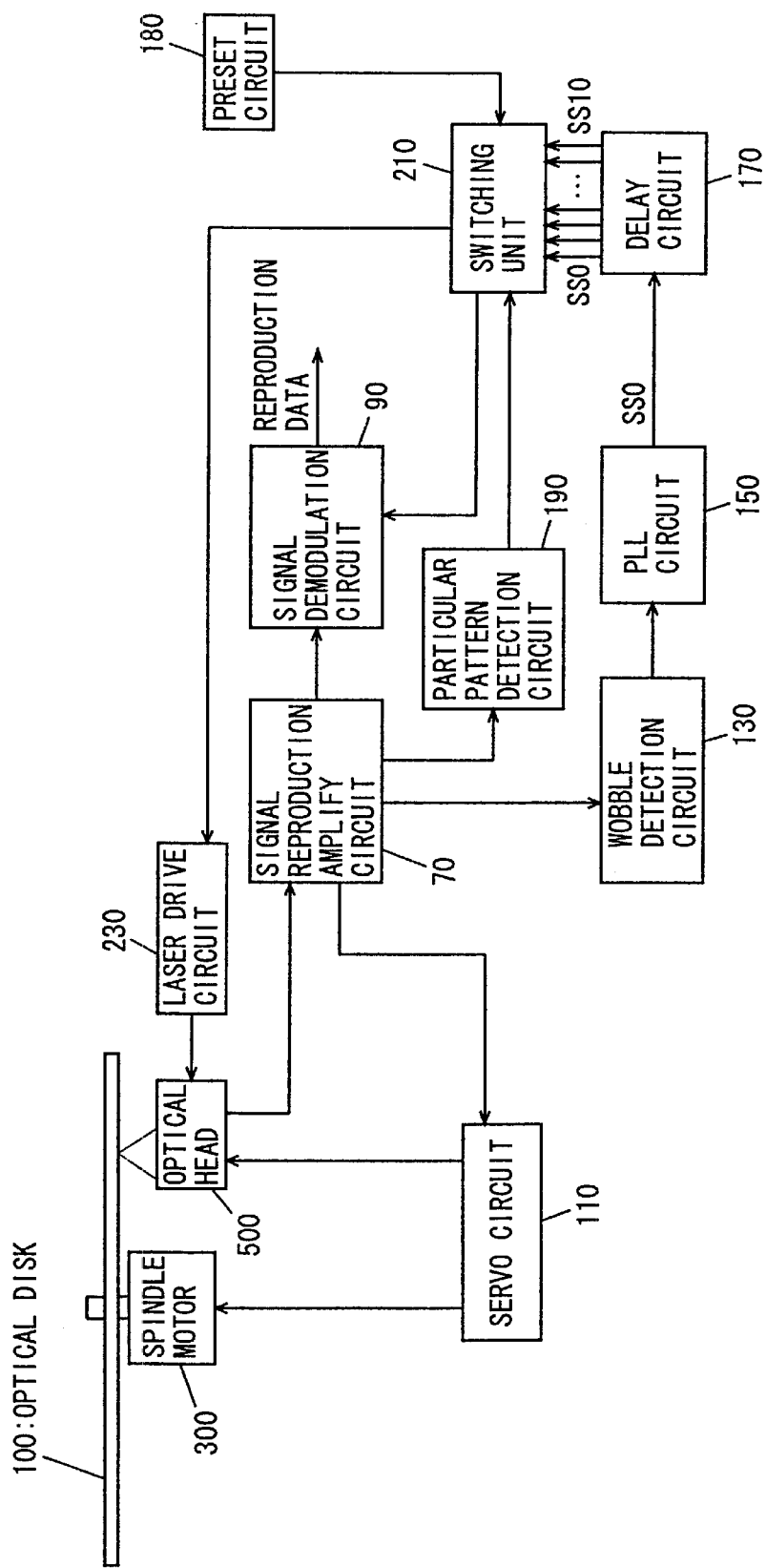
FIG. 1 is a block diagram showing an entire structure of an information reproduction apparatus according to a first embodiment of the present invention.

The information reproduction apparatus, information recording apparatus, and a reference mark detection circuit according to the present invention will be described in detail with reference to the drawings.

In the drawings, the same reference characters denote the same or corresponding components.

[First Embodiment]

FIG. 1 is a block diagram showing a structure of the information reproduction apparatus according to a first embodiment of the present invention.

Figure 2:
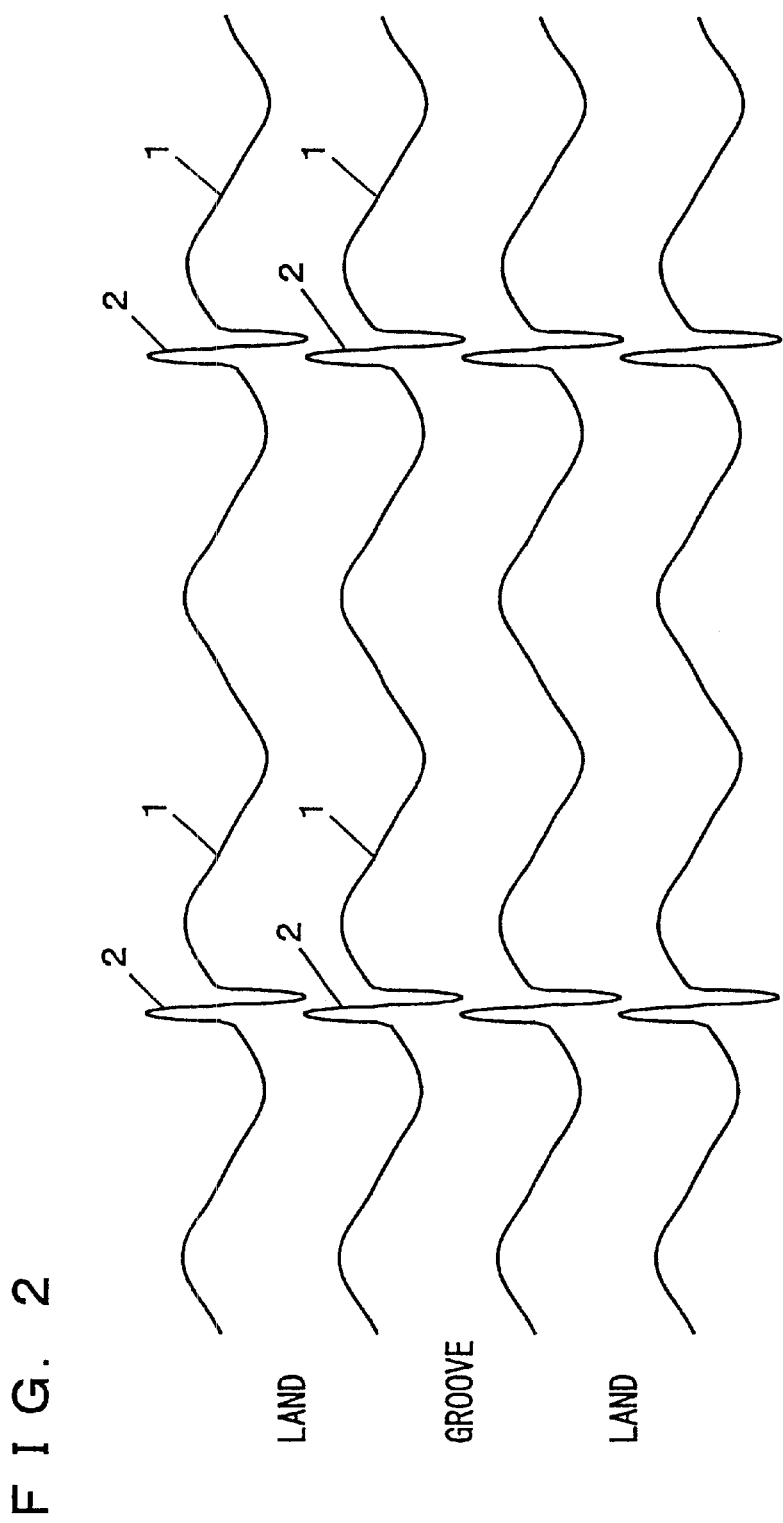
FIG. 2 is a plan view showing a track structure having a wobble at both sides of a groove in the optical disk of FIG. 1.
Figure 3:
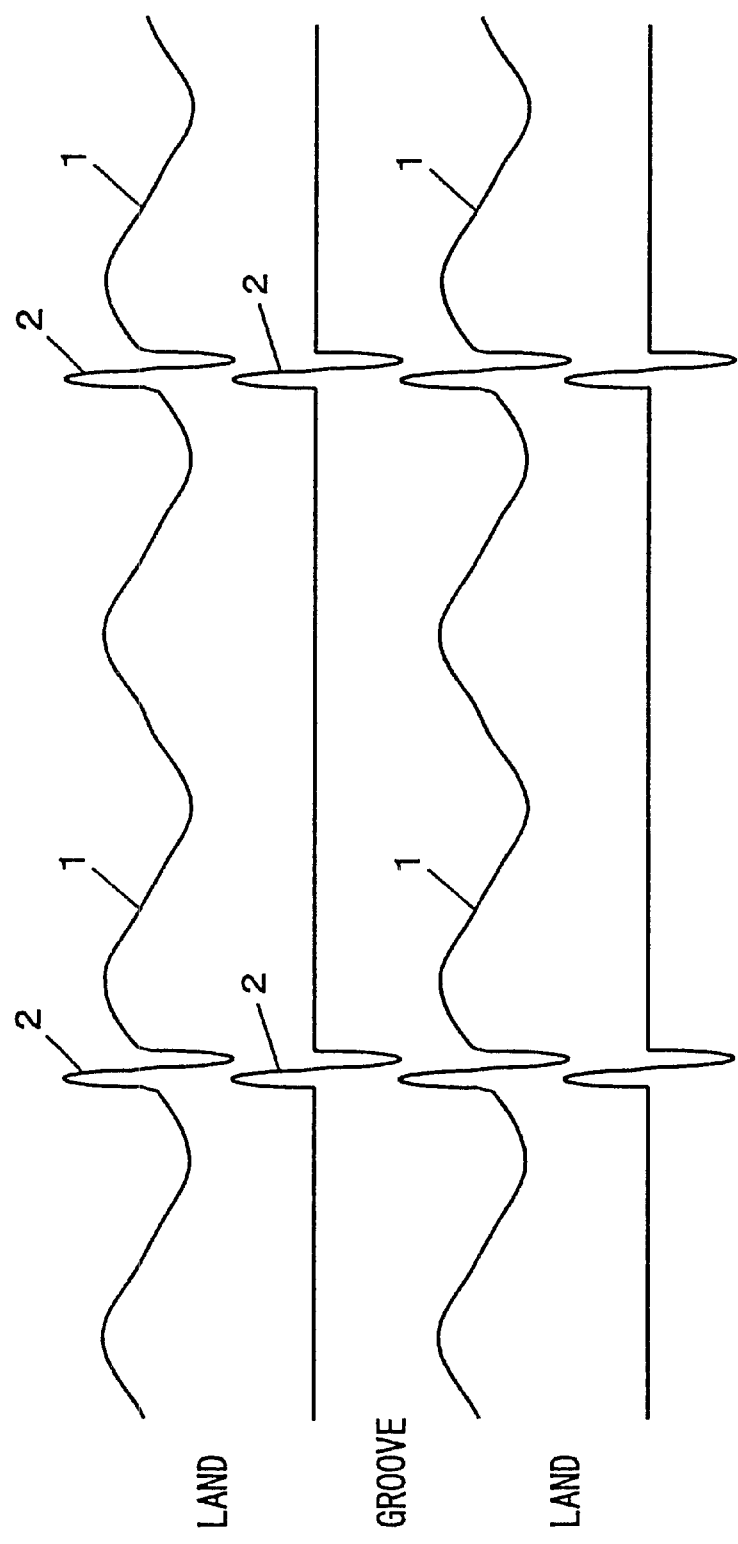
FIG. 3 is a plan view showing a track structure having a wobble formed at only one side of a groove in the optical disk of FIG. 1.

FIGS. 2 and 3 schematically show the plane configuration of a track formed on the surface of a recording medium, for example, a magneto-optical disk. In each drawing, the region for tracking is called "groove", and the region between the grooves is called "land" hereinafter.

FIG. 2 shows the plane configuration of a magneto-optical disk in which a wobble 1 of a gentle and relatively long period is continuously formed at both sidewalls of a groove, and in which a plurality of abrupt address marks (or fine clock mark) 2 as reference marks are formed intermittently along the track direction at a constant interval at both sidewalls. FIG. 3 shows the plane configuration of a magneto-optical disk in which a wobble 1 of a gentle and relatively long period is continuously formed at only one side of a groove, and a plurality of address marks 2 are formed intermittently along the track direction at a constant interval at both sidewalls.

In FIGS. 2 and 3, the gentle waveform of wobble 1 is, as described before, modulated by a signal such as an address information signal or a synchronizing signal. At the time of recording/reproduction, the address information signal and synchronizing signal are demodulated to be used in the recording/reproduction operation. Address mark 2 having an abrupt waveform is a reference mark to indicate the beginning of data, the timing of signal recording/reproduction, and determining whether the laser beam is on the center line of the track. It is detected as a reference timing signal to which the operation will be referenced in recording/reproduction. The period of wobble 1 has a range of, for example, 10–35 µm.

As shown in FIG. 1, the information reproduction apparatus includes a spindle motor 300 for rotating an optical disk 100 at a predetermined speed of rotation, an optical head 500 directing a laser beam having a wavelength of 680 nm at a predetermined timing onto optical disk 100 to read out information such as the data and synchronizing signal recorded magnetically in advance on optical disk 100 and a wobble signal according to wobble 1 that is recorded physically, a signal reproduction amplify circuit 70 connected to optical head 500 to amplify and separate each signal of optically-reproduced data, synchronizing signal, wobble signal, and error signal, and a signal demodulation circuit 90 connected to signal reproduction amplify circuit 70 to generate in synchronization with an input clock signal reproduction data by demodulating the data amplified by signal reproduction amplify circuit 70 according to the modulated method in recording.

Further included are a servo circuit 110 receiving an error signal of a low frequency amplified and separated by signal reproduction amplify circuit 70 to rotate spindle motor 300 at a predetermined speed of rotation and also controlling the objective lens included in optical head 500 to carry out tracking servo and focus servo, a wobble detection circuit 130 connected to signal reproduction amplify circuit 70 to detect a wobble signal as a first period signal out from the amplified signal, a PLL circuit 150 connected to wobble detection circuit 130 to generate a predetermined synchronizing signal SSO according to the wobble signal, a delay circuit 170 connected to PLL circuit 150 to generate a plurality of synchronizing signals SS0–SS10 having different phases, a particular pattern detection circuit 190 connected to signal reproduction amplify circuit 70 to detect a particular pattern as a reproduced second period signal, a switching unit 210 to selectively supply one synchronizing signal out of the plurality of synchronizing signals SS0–SS10 generated from delay circuit 170, having a predetermined phase difference from that of the particular pattern, to a laser drive circuit 230 and to a signal demodulation circuit 90, a preset circuit 180 for presetting the predetermined phase difference equal to the phase difference of recording, and a laser drive circuit 230 controlling optical head 500 so that a laser pulse beam for reproduction is directed onto optical disk 100 at a predetermined timing according to the synchronizing signal supplied from switching unit 210.

Delay circuit 170 includes ten delay elements 171–174 connected in series, as shown in FIG. 5.

The operation of the information reproduction apparatus according to the first embodiment of the present invention will be described hereinafter.

Wobble detection circuit 130 detects a wobble signal from the reproduced amplified signal. The wobble signal shown in FIG. 4A is supplied to PLL circuit 150.

PLL circuit 150 binarizes the supplied wobble signal to generate a synchronizing signal according to the binarized signal in synchronization with the timing of the binalized signal attaining a high level.

That synchronizing signal is frequency-multiplied. A synchronizing signal SS0 having a frequency 100 times that of the wobble signal is generated and output as shown in FIG. 4B.

As shown in FIG. 5, synchronizing signal SSO is input to delay circuit 170. The synchronizing signal delayed by a predetermined time t at delay element 171 is output as synchronizing signal SS1. The synchronizing signal further delayed by time t at delay element 172 is output as synchronizing signal SS2. In a similar manner, synchronizing signals SS0–SS10 are output sequentially from delay circuit 170 to switching unit 210.

As shown in FIGS. 6C–6M, time t is set as the time of, for example 1/10 the half period T1–T3 of synchronizing signal SS0.

Figure 6:
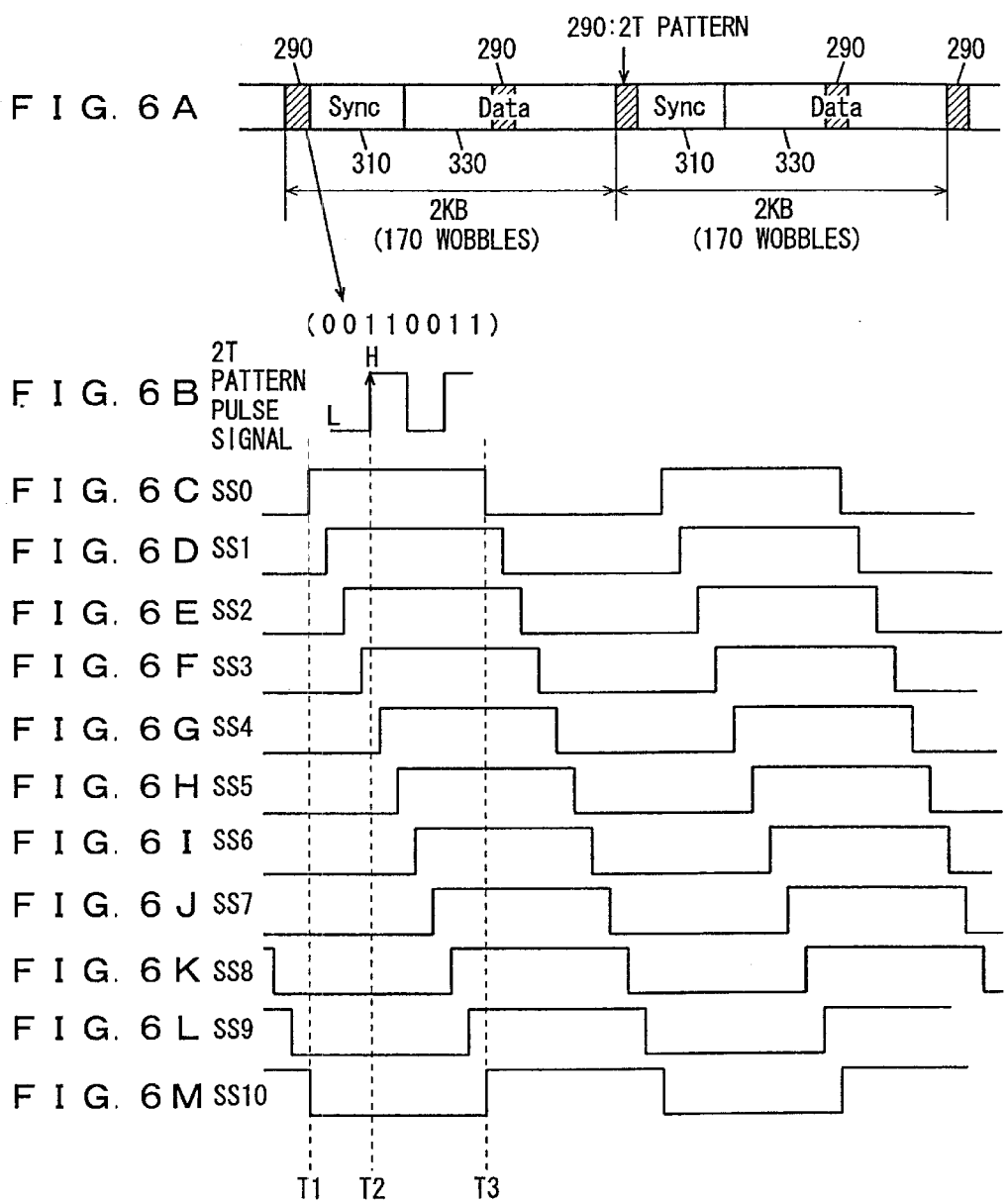
FIGS. 6A–6M are timing charts for describing an operation of the particular pattern detection circuit and switching unit of FIG. 1.

The information as shown in FIG. 6A is magnetically recorded on optical disk 100. More specifically, data 33 and a synchronizing signal 31 indicating the beginning of data 33 are recorded in the one cycle of 2 kB (170 wobbles). Also, the data (particular pattern, also called "2T pattern" hereinafter) 290 of 8 bits of (00110011) shown in FIG. 6B is recorded at two positions, i.e., the beginning of each period and during data 330.

Particular pattern detection circuit 190 detects the 2T pattern pulse signal shown in FIG. 6B that is reproduced amplified by signal reproduction amplify circuit 70. This detected pulse signal is provided to switching unit 210.

Switching unit 210 selects one of the synchronizing signals SS0–SS10 supplied from delay circuit 170 that has the preset phase difference preset of preset circuit 180 from the 2T pattern pulse signal to provide the selected synchronizing signal to laser drive circuit 230.

For example, when a value approximating 0 is set as the phase base difference from the 2T pattern pulse signal in preset circuit 180, switching unit 210 selects one synchronizing signal SS3 that attains a high level at a time closest to time T2 where the 2T pattern pulse signal of FIG. 6B first attains a high level.

As a result of signal demodulation circuit 90 establishing synchronization by this selected one synchronizing signal SS3, the signal reproduced amplified by signal reproduction amplify circuit 70 is demodulated to result in reproduction data.

This one selected synchronizing signal SS3 is provided to laser drive circuit 230, whereby optical head 500 projects a laser beam that is pulsed in synchronization with synchronizing signal SS3 to optical disk 100.

2T pattern 290 is also inserted in data 330 to supply a predetermined synchronizing signal reliably to laser drive circuit 230 and signal demodulation circuit 90. The desired synchronizing signal is reselected (selection is reevaluated) during one period.

According to the information reproduction apparatus of the first embodiment, error in data reproduction can be reduced by establishing the optimum timing for data reproduction with respect to the data recorded magnetically.

Also, information of high density can be reproduced accurately by preventing the drop of reproduction data to carry out reproduction properly.

The information reproduction apparatus according to the first embodiment of the present invention is premised on the magnetic recording of a particular pattern (2T pattern) 290 on a mounted optical disk 100 from which one synchronizing signal having a predetermined phase difference is selected by switching unit 210 with the reference of the 2T pattern 290 in the reproduction of optical disk 100. Alternatively, an information reproduction apparatus that detects a fine clock mark 2 physically recorded as shown in FIGS. 2 and 3 instead of 2T pattern 290 to select one synchronizing signal having a predetermined phase difference with the detected signal as the reference by switching unit 210 is similarly applicable.

[Second Embodiment]

Figure 7:
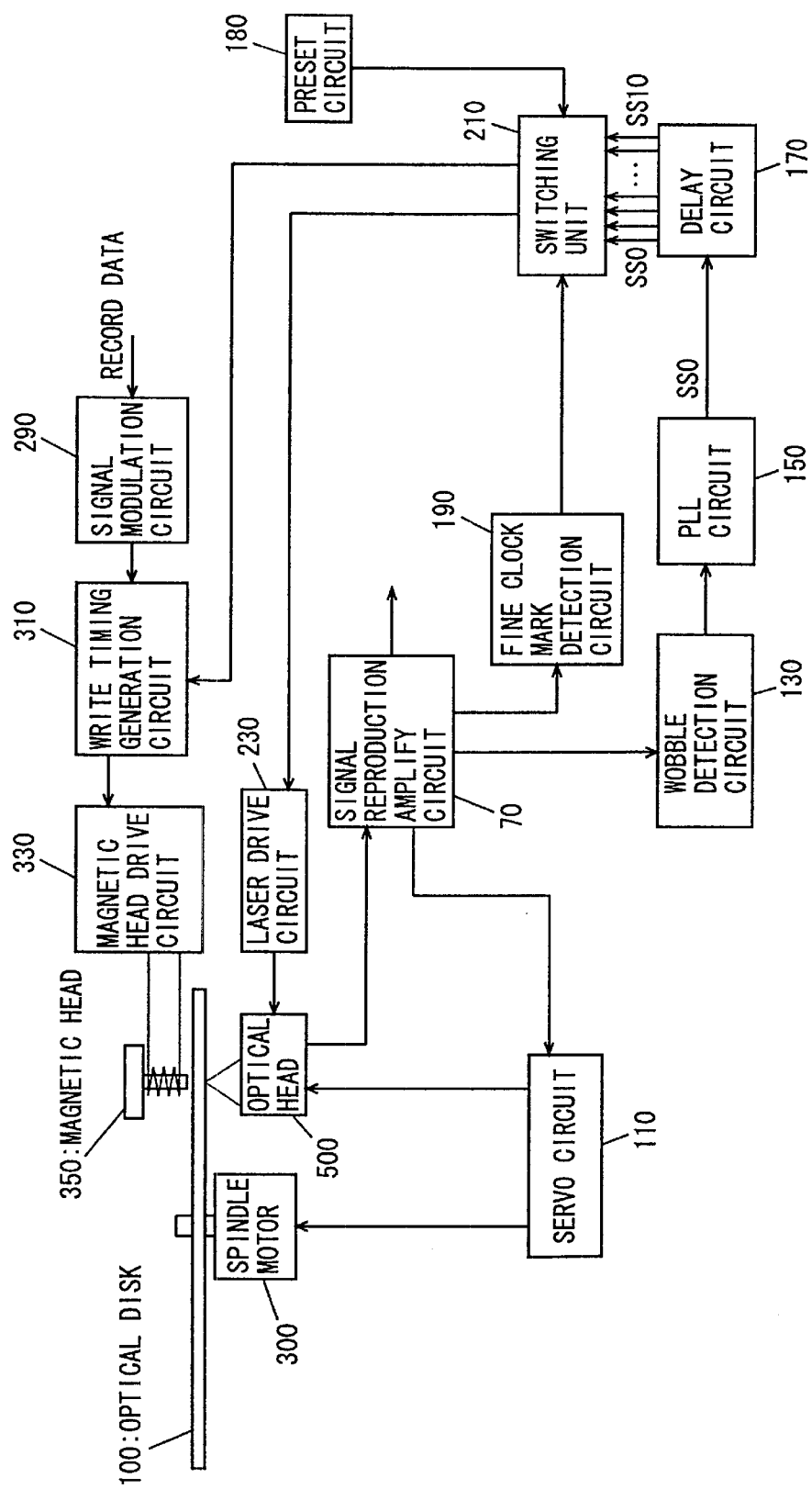
FIG. 7 is a block diagram showing a structure of an information recording/reproduction apparatus according to a second embodiment of the present invention.

FIG. 7 is a block diagram showing a structure of an information recording/reproduction apparatus according to a second embodiment of the present invention.

As shown in FIG. 7, the information recording/reproduction apparatus includes a signal modulation circuit 290 modulating the recorded data at a predetermined modulation system such as the 1–7 system, a write timing generation circuit 310 connected to signal modulation circuit 290 and a switching unit 210, generating a magnetic head drive signal to establish timing of writing data into optical disk 100 according to the signal modulated by signal modulation circuit 290 and the synchronizing signal from switching unit 210, a magnetic head 350 applying a magnetic field to optical disk 100, and a magnetic head drive circuit 330 driving magnetic head 350 so as to apply a magnetic field in a direction determined by a magnetic head drive signal.

Further included are a spindle motor 300 to rotate optical disk 100 at a predetermined speed of rotation, an optical head 500 directing a laser pulse beam having a wavelength of 680 nm at a predetermined timing on optical disk 100 to magnetically record data and the like onto optical disk 100 and also reading out information such as the data and synchronizing signal recorded magnetically, a wobble signal, a fine clock signal, or the like according to physically recorded wobble 1 and fine clock mark 2, a signal reproduction amplify circuit 70 connected to optical head 500 for amplifying and separating each of the signals of the data, synchronizing signal, wobble signal, fine clock signal, and error signal optically-reproduced, and a servo circuit 110 receiving an error signal of low frequency amplified and separated by signal reproduction amplify circuit 70 to rotate spindle motor 300 at a predetermined speed of rotation, and also controlling the objective lens included in optical head 500 so as to carry out tracking servo control and focus servo control.

Further included are a wobble detection circuit 130 connected to signal reproduction amplify circuit 70 to detect a wobble signal as a first period signal out of the amplified signal, a PLL circuit 150 connected to wobble detection circuit 130 to generate a predetermined synchronizing signal SS0 according to the wobble signal, a delay circuit 170 connected to PLL circuit 150 to generate a plurality of synchronizing signals SS0–SS10 of different phases, a fine clock mark detection circuit 190 connected to signal reproduction amplify circuit 70 to detect a fine clock signal as a reproduced second synchronizing signal, a switching unit 210 selectively providing to a write timing generation circuit 310 and a laser drive circuit 230 a synchronizing signal out of the plurality of synchronizing signals SS0–SS10 generated from delay circuit 170 that has a predetermined phase difference from the fine clock signal, a preset circuit 180 for presetting the predetermined phase difference, and a laser drive circuit 230 for controlling optical head 500 so that a laser pulse beam is directed to optical disk 100 at a predetermined timing according to the synchronizing signal supplied from switching unit 210 in data recording and reproduction.

The recording operation of the above information recording/reproduction apparatus according to the second embodiment of the present invention will be described hereinafter.

Figure 8:
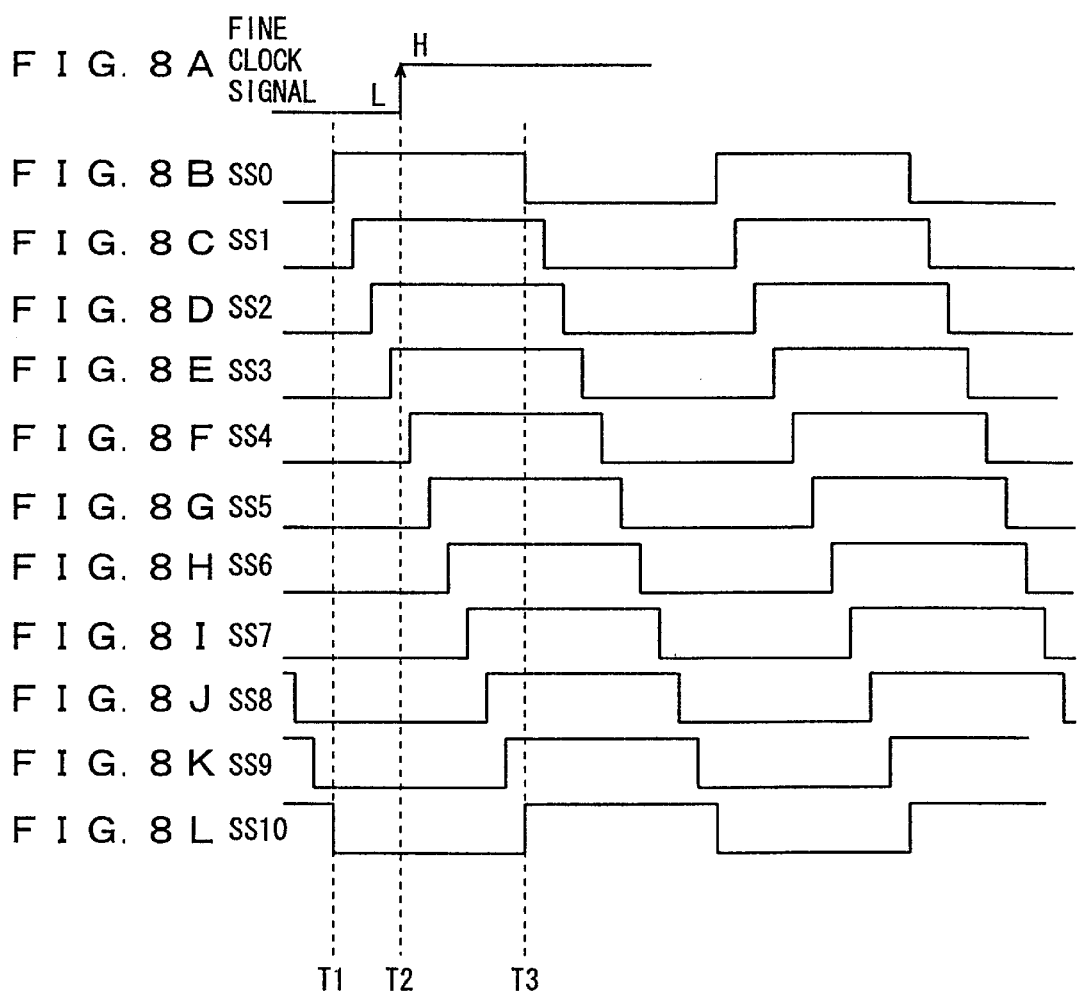
FIGS. 8A–8L are timing charts for describing an operation of the switching unit of FIG. 1.

This operation is similar to the operation of the information reproduction apparatus of the first embodiment, provided that fine clock mark detection circuit 190 detects the fine clock signal from the signal reproduced amplified by signal reproduction amplify circuit 70 and provides to switching unit 210 the fine clock signal taking a high (H) level for a predetermined time shown in FIG. 8A.

Switching unit 210 selects one synchronizing signal that attains a high level the preset time (phase) of preset circuit 180 behind time T2 where the fine clock signal of FIG. 8A attains a high level, and supplies the selected synchronizing signal to write timing generation circuit 310 and laser drive circuit 230.

When the value is set as a phase difference approximating 0 at preset circuit 180, synchronizing signal SS3 of FIG. 8E that attains a high level at the time closest to time T2 is selected by switching unit 210. The same synchronizing signal SS3 is supplied to write timing generation circuit 310 and laser drive circuit 230.

By driving magnetic head 350 and optical head 500 with the same synchronizing signal, a laser pulse beam can be directed at a desired timing when a predetermined magnetic field is applied to optical disk 100. Thus, data can be recorded at high density appropriately.

The reproduction operation of the information recording/reproduction apparatus according to the second embodiment of the present invention will be described hereinafter.

This operation is similar to the reproduction operation of the information reproduction apparatus of the first embodiment, provided that fine clock mark detection circuit 190 detects a fine clock signal from the signals reproduced and amplified by signal reproduction amplify circuit 70 to supply a fine clock signal having a high level for a predetermined time to switching unit 210.

Switching unit 210 selects one (in the above example, synchronizing signal SS3 is selected) of synchronizing signals SS0–SS10 having a phase difference set by preset circuit 280 in recording with respect to the fine clock signal. The selected signal is supplied to laser drive circuit 230.

Laser drive circuit 230 responds to the supplied synchronizing signal to drive optical head 500 so as to emit a laser pulse beam at a predetermined timing to optical disk 100.

The optically reproduced data and the like are applied to signal reproduction amplify circuit 70 to be amplified. The amplified signal is demodulated according to the modulation system of signal modulation circuit 290 in recording, whereby reproduction data is generated (demodulation circuit is not depicted).

According to the information recording/reproduction apparatus of the second embodiment of the present invention, data is recorded taking advantage of a synchronizing signal having a predetermined phase difference on the basis of a fine clock mark 2 that is physically recorded on optical disk 100. Therefore, recording of equal quality can be reliably carried out. Furthermore, since the recorded data is reproduced using a synchronizing signal having the predetermined phase difference used in recording, a more accurate and reliable reproduction data can be obtained.

[Third Embodiment]

Although the formation of an address mark (or fine clock mark) at the groove on recording medium in addition to a wobble is conventionally proposed, a circuit that detects such an address mark accurately with the simple structure has not yet been proposed.

In the following embodiment, a reference mark detection circuit that detects particularly an address mark accurately will be described in detail.

Figure 9:
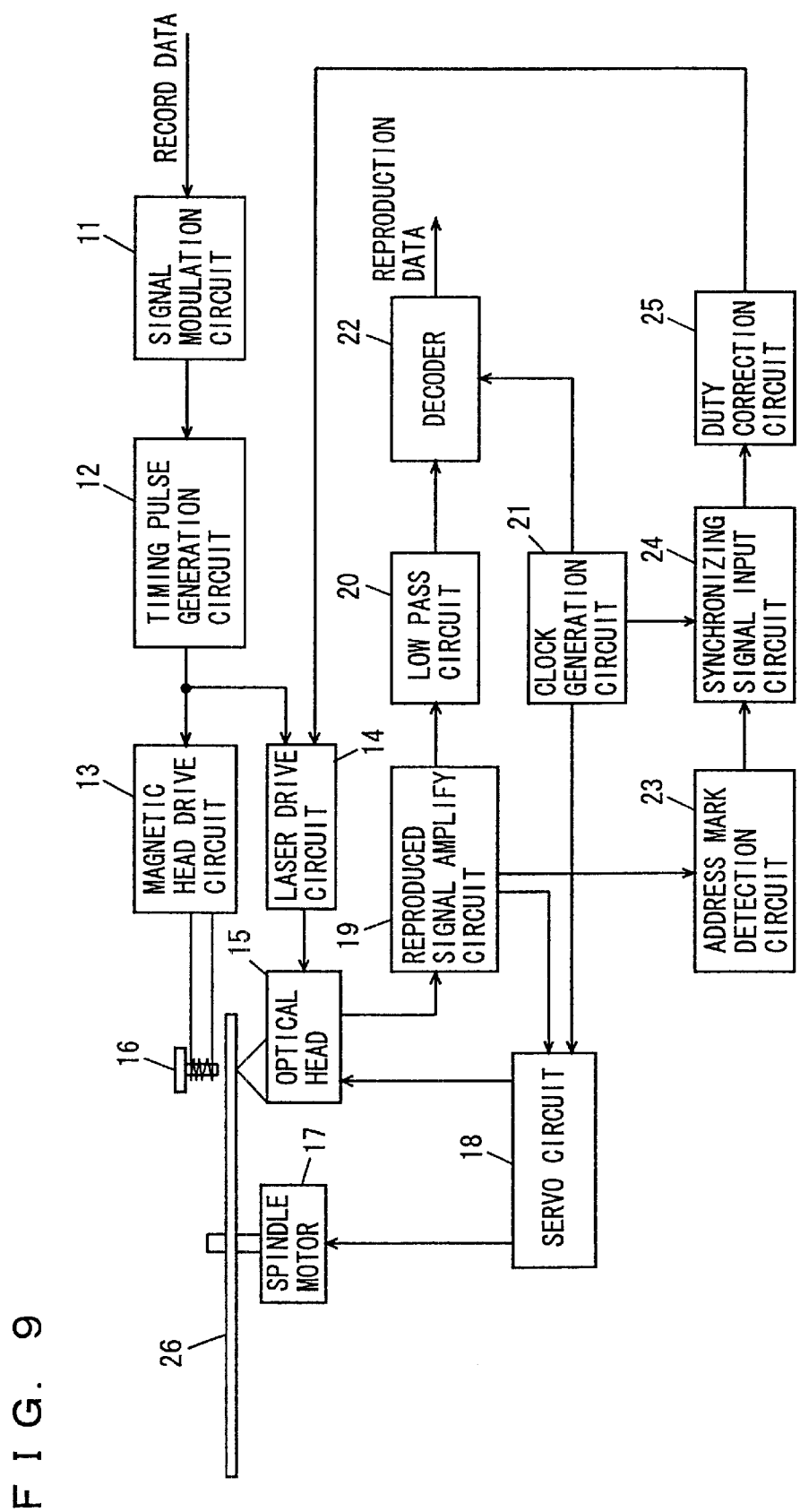
FIG. 9 is a block diagram showing an entire structure of an information recording/reproduction apparatus according to a third embodiment of the present invention.

FIG. 9 is a block diagram showing an entire structure of an information recording/reproduction apparatus including a reference mark (address mark or fine clock mark) detection circuit to detect address mark 2 shown in FIGS. 2 and 3.

First, the entire structure of an information recording/reproduction apparatus of a magneto-optical disk according to a third embodiment of the present invention will be described with reference to FIG. 9.

Referring to FIG. 9, the information recording/reproduction apparatus includes a signal modulation circuit 11, a timing pulse generation circuit 12, a magnetic head drive circuit 13, a laser drive circuit 14, an optical head 15, a magnetic head 16, a spindle motor 17, a servo circuit 18, a reproduced signal amplify circuit 19, a low pass circuit 20, a clock generation circuit 21, a decoder 22, an address mark detection circuit 23, a synchronizing signal input circuit 24, and a duty correction circuit 25.

First, the recording operation of the information recording/reproduction apparatus of FIG. 9 will be described. The record data indicating the information to be recorded is sent to signal modulation circuit 11 to be modulated by, for example, the 1–7 RLL system. Following the modulation of the 1–7 RLL system, the data is sent to timing pulse generation circuit 12 to be modified into a pulse signal having a predetermined duty ratio. Also, the predetermined phase difference is set. Then, the pulse signal is sent to magnetic head drive circuit 13 and laser drive circuit 14.

Laser drive circuit 14 turns on/off the semiconductor laser (not shown) in optical head 15 in response to the sent pulse signal. As a result, a pulsed laser beam is directed on magnet-optical disk 26. Magnetic head drive circuit 13 responds to the applied record signal to drive magnetic head 16, whereby the record signal is recorded on magneto-optical disk 26.

In the present embodiment, the phase of the pulse laser beam is behind the phase of the record magnetic field by 0–60 ns. The duty ratio of the pulse laser beam is 20–60%. The information to be recorded is not limited to the above video signal, and may be an audio signal, a data signal, and the like.

The reproduction operation of the information recording/reproduction apparatus of FIG. 9 will be described hereinafter.

A laser beam is emitted from the semiconductor laser (not shown) of optical head 15. The beam passes through an objective lens (not shown) in optical head 15 to be directed on the recording plane of magneto-optical disk 26. The light reflected from the recording plane is detected by a photodetector (not shown) in head 15, whereby a reproduced signal is output from optical head 15.

The obtained reproduced signal is sent to reproduced signal amplify circuit 19 to be amplified. The amplified signal is sent to low pass circuit 20. The reproduced signal passing through low pass circuit 20 is sent to decoder 22 to be demodulated by the 1–7 system in synchronization with the clock signal sent from clock generation circuit 21 to be output as reproduction data.

The reproduced signal is amplified by reproduced signal amplify circuit 19 and sent to servo circuit 18. Servo circuit 18 controls optical head 15 and spindle motor 17, whereby data is read out from magnetooptical optical disk 26.

The reproduced data amplified by reproduced signal amplify circuit 19 is also applied to address mark detection circuit 23 of the present invention. Address mark detection circuit 23 detects the address mark formed at the groove of the magneto-optical disk shown in FIG. 2 or 3 to generate a reference timing signal. Synchronizing signal input circuit 24 generates a synchronizing signal to direct a laser beam onto disk 26 according to the reference timing signal from address mark detection circuit 23. The generated synchronizing signal is applied to duty correction circuit 25.

Duty correction circuit 25 generates a pulse signal of a predetermined duty according to the synchronizing signal from synchronizing signal input circuit 24. The generated pulse signal is applied to laser drive circuit 14. Laser drive circuit 14 controls optical head 15 according to the pulse signal from duty correction circuit 25, whereby the reproduction laser beam is pulsed. The output pulse signal from duty correction circuit 25 may be applied to signal modulation circuit 11 as the trigger of signal modulation.

Figure 10:
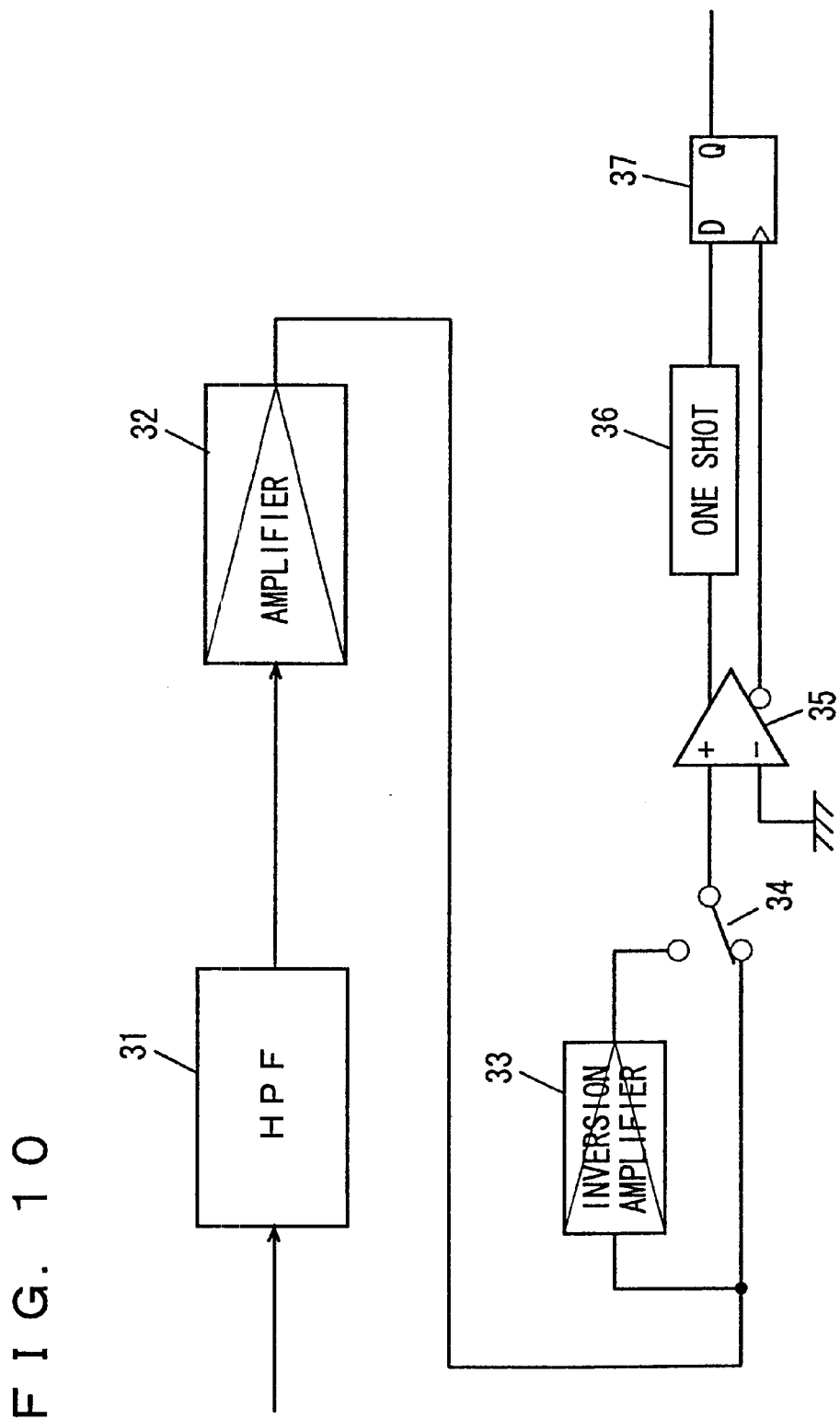
FIG. 10 is a block diagram showing a structure of the address mark detection circuit of FIG. 9.

FIG. 10 is a block diagram showing the structure of address mark detection circuit 23 out of the entire structure of the information recording/reproduction apparatus of FIG. 9. In the third embodiment, an address mark detection signal that is particularly formed to correspond to a magneto-optical disk in which the amplitude of the wobble is identical to the amplitude of the address mark will be described in detail.

Referring to FIG. 10, the reproduced signal output from reproduced signal amplify circuit 19 of FIG. 9 is applied to amplifier 32 via high pass filter 31 to be amplified. The output from amplifier 32 is applied to one fixed terminal of switch circuit 34 and also to the other fixed terminal of switch circuit 34 via an inversion amplifier 33. The movable terminal of switch circuit 34 is applied to the positive input terminal of comparator 35. The switching control of switch circuit 34 is effected by a control signal from a control circuit not shown.

The negative input terminal of a comparator 35 is connected to the ground potential. The output of comparator 35 is applied to a one shot circuit 36. The output of one shot circuit 36 is applied to the data input of a flip-flop circuit 37. The inverted output of comparator 35 is applied to the clock input of flip-flop circuit 37. Flip-flop circuit 37 outputs a reference timing signal, which is applied to synchronizing signal input circuit 24 of FIG. 9.

FIGS. 11A–11E are timing charts for describing the operation of the address mark detection circuit of FIG. 10. The operation of the address mark detection circuit according to the third embodiment of the present invention will be described hereinafter with reference to FIGS. 10 and 11A–11E.

Figure 11:
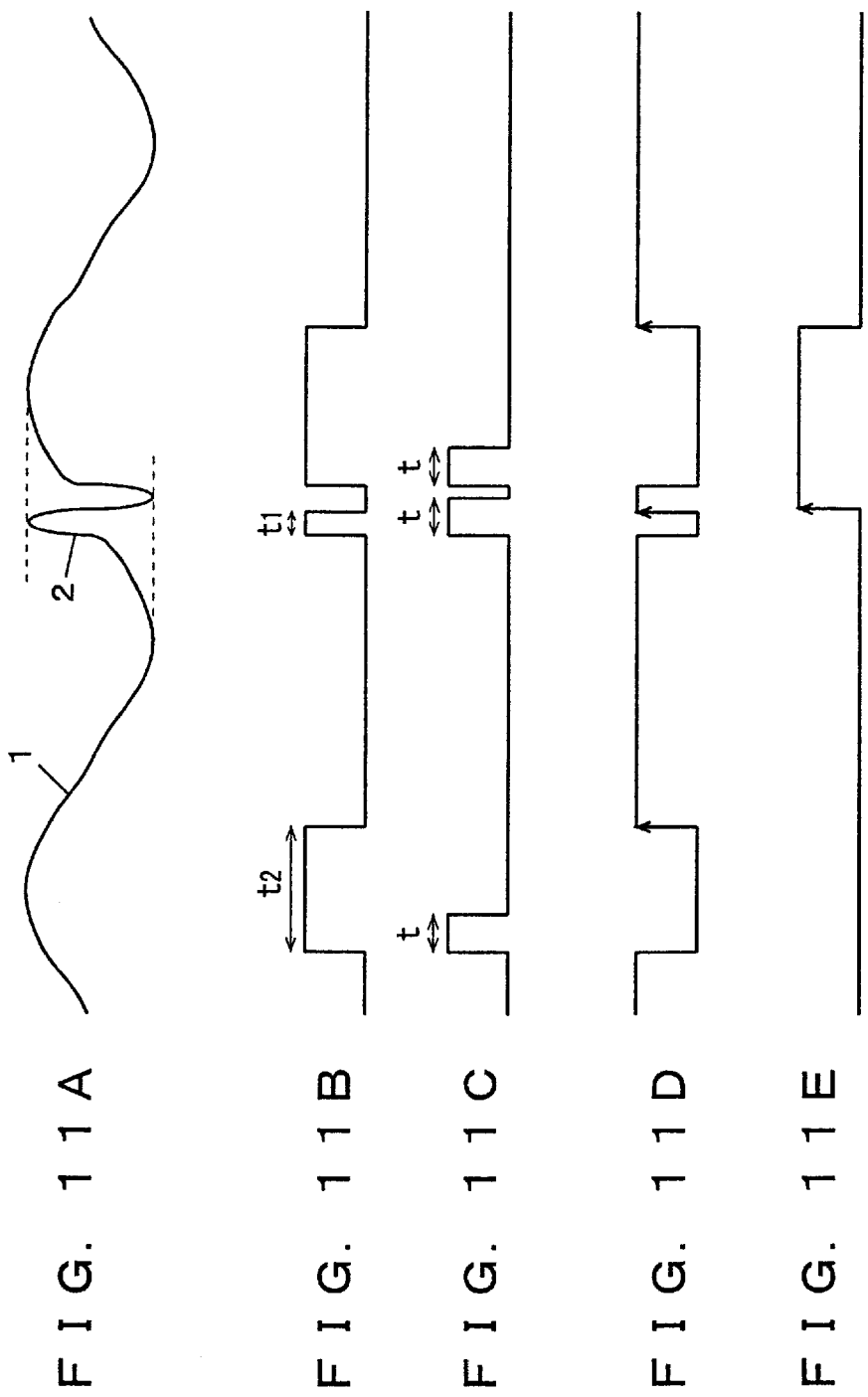
FIGS. 11A–11E are timing charts for describing an operation of the address mark detection circuit of FIG. 10.

First, the output of amplifier 32 is applied to the positive input of comparator 35 by switch circuit 34. The waveform at the positive input of comparator 35 is represented in FIG. 11A. This signal is a reproduced electrical signal having a waveform corresponding to the plane configuration of the groove of magneto-optical disk 26. This waveform includes a relatively gentle wobble 1 and an abrupt address mark 2 formed thereon at a predetermined interval.

It is assumed that address mark 2 always has the shape as shown in FIG. 11A in the embodiment set forth in the following. However, the waveform of this address mark 2 may be inverted depending upon the disk. In such a case, the waveform of the address mark at the positive input of comparator 35 is maintained at the shape shown in FIG. 11A by providing the output via inversion amplifier 33 to the positive input of comparator 35 by controlling switch circuit 34 by a control circuit not shown.

The waveform (FIG. 11A) applied to the positive input of comparator 35 is compared with the reference level (here, ground level) applied to the negative input. The comparison result (FIG. 1B) is applied to one shot circuit 36. One shot circuit 36 generates a pulse having a constant duration t (FIG. 11C) in synchronization with the rise of the output (FIG. 11B) of comparator 35. The generated pulse is applied to the data input of flip-flop circuit 37.

The inverted output (FIG. 11D) of comparator 35 is applied to the clock input of flip-flop circuit 37. Flip-flop circuit 37 maintains the level of the data input (FIG. 11C) for every rise (arrow) of the clock input (FIG. 11D) to output the maintained level as the reference timing signal (FIG. 11E).

As to the output of comparator 35, t is preset so that the relationship of $t_1 < t < t_2$ is established where $t_2$ is the duration of the pulse indicating the comparison result between a portion 1 of the wobble and the reference level (ground potential), $t_1$ is the duration of the pulse indicating the comparison result between the portion of address mark 2 and the reference level, and t is the duration of the output pulse of one shot circuit 36.

When a pulse of a duration $t_2$ indicating the comparison result with wobble 1 is generated at the output (FIG. 11B), an L level is always detected at the rise of the clock input (FIG. 11D) since duration t of the one shot pulse of the signal (FIG. 11C) is shorter than $t_2$. However, when a pulse of a duration $t_1$ corresponding to address mark 2 is generated at the output (FIG. 11B), an H level is detected at the rise of the clock input (FIG. 11D) of flip-flop circuit 37 since a one shot pulse of a duration t longer than duration $t_1$ is generated. The detected H level continues until an L level is detected at the timing corresponding to the trailing edge of the next detected pulse of wobble 1.

Thus, the detection pulse is generated at the output of flip-flop circuit 37 only when a signal corresponding to address mark 2 of duration $t_1$ is detected.

According to the third embodiment of the present invention, the gentle waveform of the wobble is not detected and only the abrupt waveform change of the address mark is detected to generate a reference timing signal properly in the case where a signal is to be reproduced from a magneto-optical disk in which the wobble and the address mark are formed having the same amplitude.

[Fourth Embodiment]

The fourth embodiment of the present invention relates to an address mark detection circuit that is formed to correspond to a magneto-optical disk in which an address mark is formed having an amplitude greater than the amplitude of the wobble.

Figure 12:
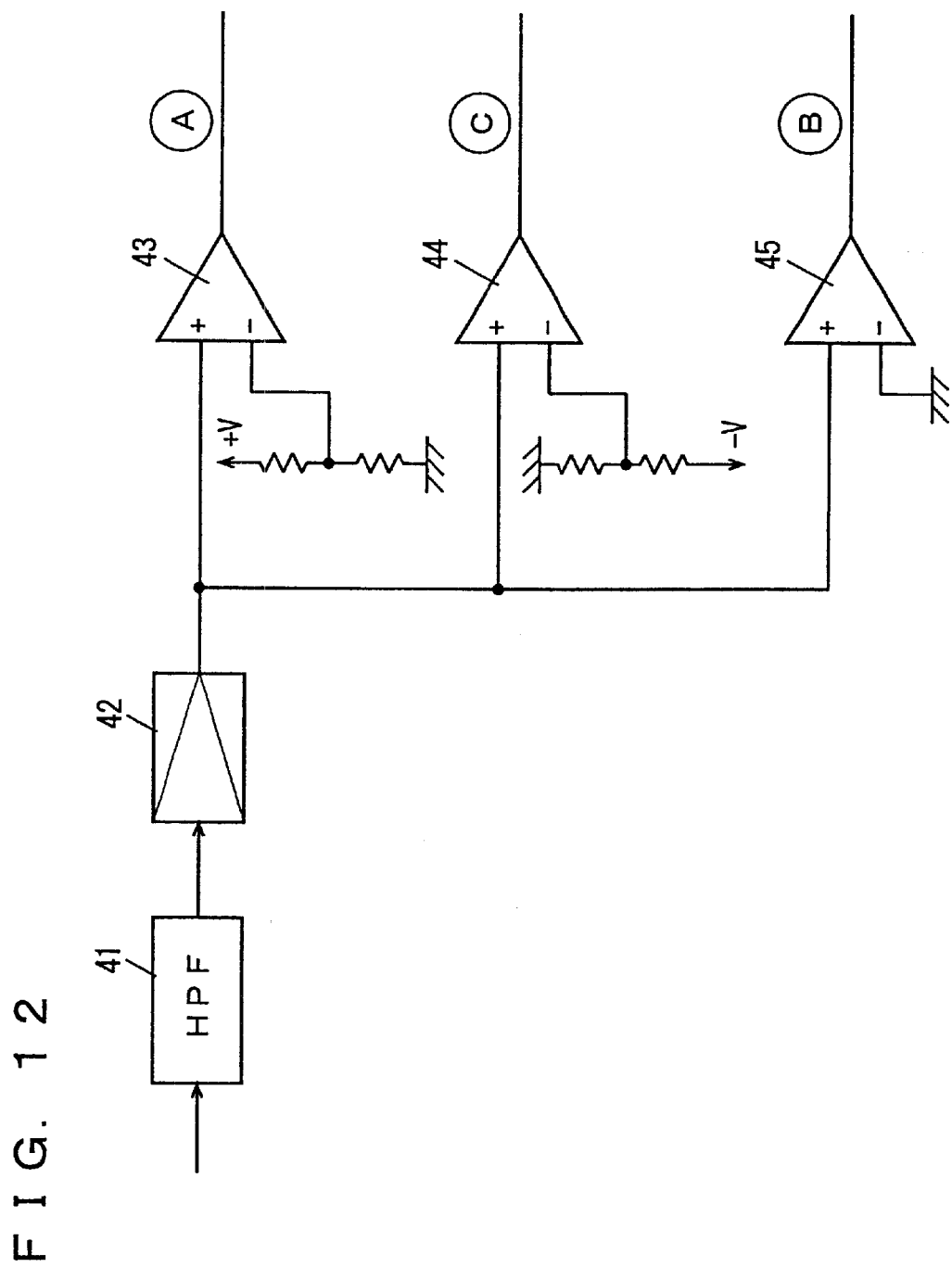
FIG. 12 is a block diagram showing the former stage of an address mark detection circuit according to a fourth embodiment of the present invention.
Figure 13:
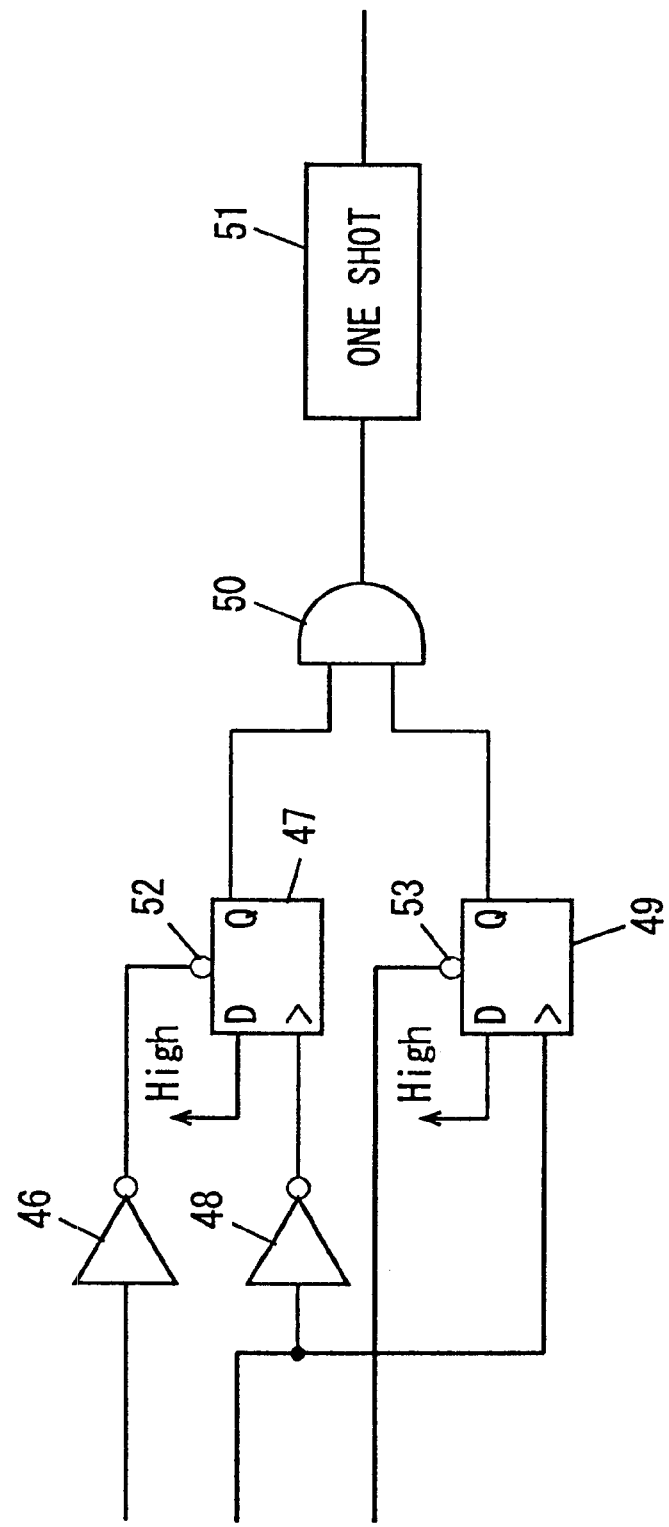
FIG. 13 is a block diagram showing the latter stage of the address mark detection circuit according to the fourth embodiment of the present invention.

FIGS. 12 and 13 are block diagrams showing a structure of the former stage portion and later stage portion, respectively, of such an address mark detection circuit.

Referring to FIG. 12, the reproduced signal from reproduced signal amplify circuit 19 of FIG. 10 is applied to amplifier 47 via a high pass filter 41 to be amplified. The output of amplifier 42 is applied in common to the positive input of comparators 43, 44, and 45.

A positive reference potential A is applied to the negative input of comparator 43. A negative reference potential C is applied to the negative input of comparator 44. A ground potential B is applied to the negative input of comparator 45.

The output of comparator 43 is applied to a reset input 52 of a flip-flop circuit 47 via an inverter 46. The output of comparator 44 is applied to a reset input 53 of flip-flop circuit 49. The output of comparator 45 is applied to the clock input terminal of flip-flop circuit 49 as well as to the clock input terminal of flip-flop circuit 47 via inverter 48.

The outputs of flip-flop circuits 47 and 49 are ANDed by an AND gate 50. The output of AND gate 50 is applied to one shot circuit 51. The output of one shot circuit 51 is output from address mark detection circuit 23 as a reference timing signal to be applied to synchronizing signal input circuit 24 of FIG. 9.

FIGS. 14A–14K and 15A–15K are timing charts for describing the operation of the address mark detection circuit of FIGS. 12 and 13. The operation represented by FIGS. 14A–14K differs from the operation represented by FIGS. 15A–15K in that the phase of the waveform of address mark 2 is inverted.

Figure 14:
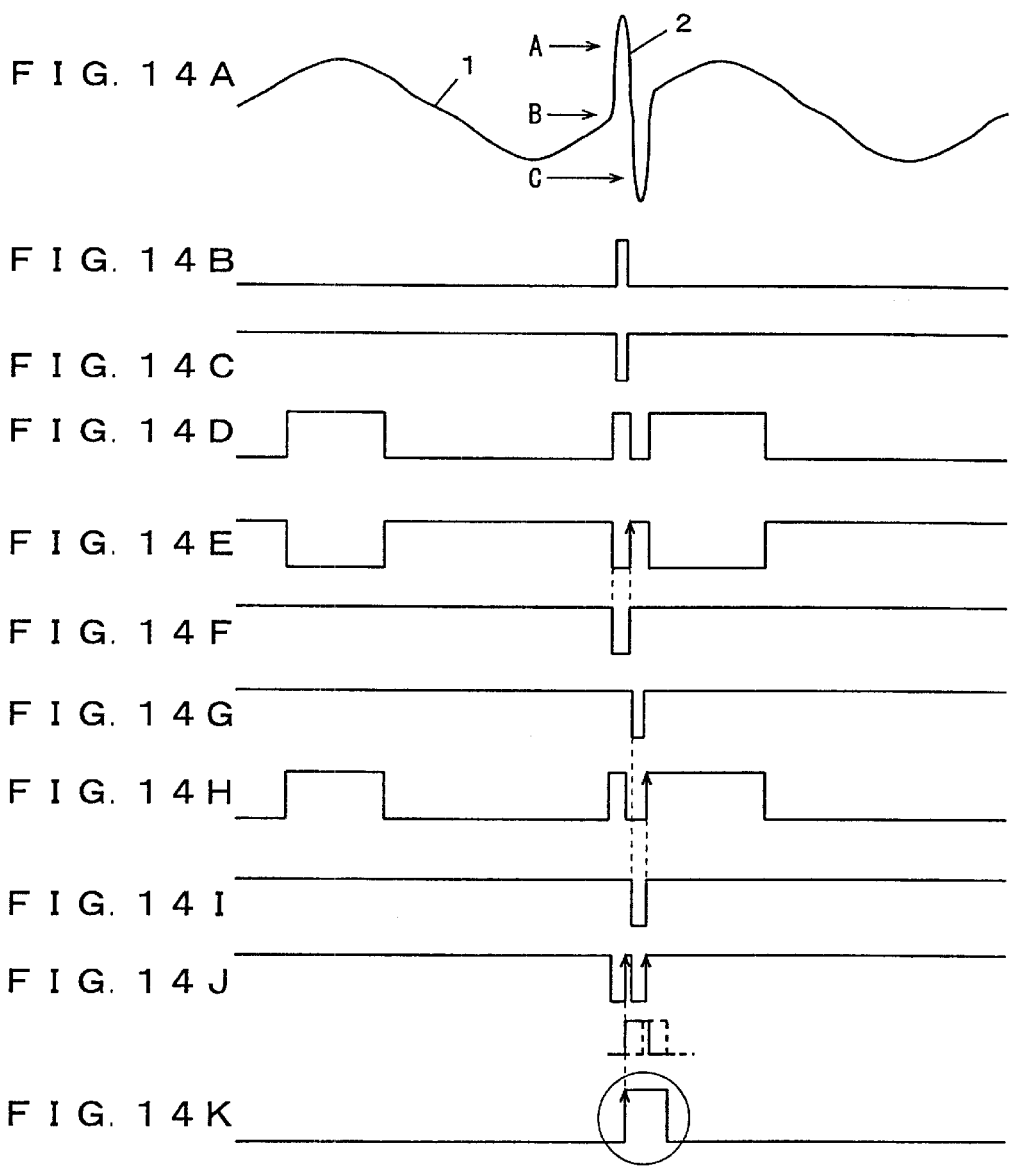
FIGS. 14A–14K are timing charts for describing an operation of the address mark detection circuit of FIGS. 12 and 13.

The operation of address mark detection circuit 23 in the case where an address mark having the waveform of FIG. 14A is detected will be described first.

An electrical signal having a waveform corresponding to the plane configuration of the groove as shown in FIG. 14A is output from amplifier 42 of FIG. 12 to be applied to the positive input of comparators 43–45. A potential corresponding to a reference level A greater than the peak value of wobble 1 and smaller than the peak value of address mark 2, as shown in A in FIG. 14A, is applied to the negative input of comparator 43. A signal (FIG. 14B) including a pulse corresponding to the comparison result between the waveform of FIG. 14A and reference level A is output from comparator 43. This signal (FIG. 14B) is inverted by inverter 46 and then applied to reset input 52 of flip-flop circuit 47.

A potential corresponding to a reference level C greater than the peak value in the negative direction of wobble 1 and smaller than the peak value in the negative direction of address mark 2, as shown in C in FIG. 14A, is applied to the negative input of comparator 44. A signal (FIG. 14G) including a pulse indicating the comparison result between the waveform of FIG. 14A and reference level C is output from comparator 44 to be applied to the reset input 53 of flip-flop circuit 49.

The ground potential B of FIG. 14A is applied to the negative input of comparator 45. A signal (FIG. 14D) including a pulse indicating the comparison result between the waveform of FIG. 14A and ground potential B is output from comparator 45. This signal (FIG. 14D) is applied to the clock input of flip-flop circuit 49, and also inverted by inverter 48 to be applied to the clock input of flip-flop circuit 47. It is assumed that the data input of flip-flop circuits 47 and 49 is connected to the potential of an H level.

Referring to FIGS. 14A–14K, when the amplitude in the positive direction of address mark 2 is detected by comparator 43 as the signal represented by FIG. 14B, flip-flop circuit 47 is reset by this inverted signal (FIG. 14C). The output (FIG. 14F) is driven from the H level to an L level. Then, flip-flop circuit 47 retains the H level of the data input at the rising (arrow) timing of the signal (FIG. 14E) which is the clock input to maintain the output (FIG. 14F) at the H level until the next reset pulse is input. In other words, a one shot pulse waveform of FIG. 14F is obtained corresponding to the amplitude in the positive direction of the address mark.

The waveform of the address mark in the negative direction is detected as the pulse (FIG. 14G) by comparator 44. Flip-flop circuit 49 is reset by this pulse (FIG. 14G), whereby the output (FIG. 14I) is driven from the H level to an L level. Then, flip-flop circuit 49 retains the data input of an H level in synchronization with the rising (arrow) timing of the signal (FIG. 14D) which is the clock input. The signal of FIG. 14I is maintained at the H level until the next reset pulse is input. In other words, a one shot pulse of FIG. 14I is detected according to the amplitude of the address mark in the negative direction. When the waveform of address mark 2 is always constant as shown in, for example, FIG. 14A, the detection of an address mark is effected by detecting either this pulse signal (FIG. 14F) or the pulse signal (FIG. 14I).

However, since there may be a case where the phase of the address mark is inverted as will be described afterwards in connection with FIGS. 15A–15K, these signals (FIG. 14F) and the signal (FIG. 14I) are ANDed (FIG. 14J) by AND gate 50 to generate a detection signal according to the result in the present fourth embodiment.

More specifically, by applying a signal (FIG. 14J) to one shot signal 51 that generates a pulse of a duration longer than the time interval of respective trailing edges of two continuous pulses that are output (FIG. 14J) from AND gate 50, a signal (FIG. 14K) including a one shot pulse indicating the detection of an address mark can be obtained.

Figure 15:
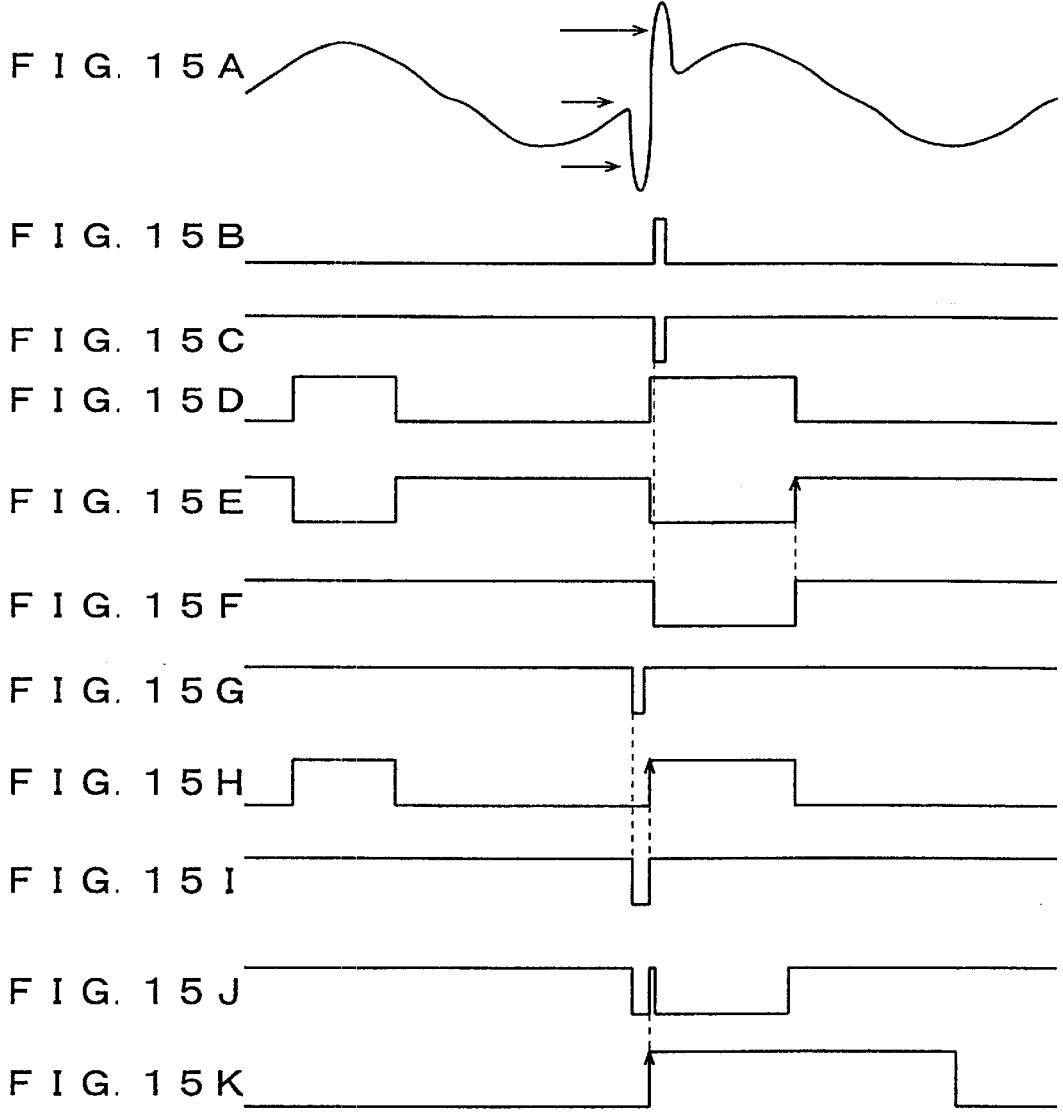
FIGS. 15A–15K are timing charts for describing an operation of the address mark detection circuit of FIGS. 12 and 13.

The operation of detecting an address mark 2 having an inverted waveform will be described with reference to FIGS. 15A–15K. The waveforms of FIGS. 15B, 15D and 15G are obtained from comparators 43, 44, and 45, respectively, of FIG. 12. Flip-flop circuit 47 is reset by a reset pulse (FIG. 15C) to latch the data of an H level at the rising (arrow) timing of the clock input (FIG. 15E). The pulse (FIG. 15F) is output from flip-flop circuit 47 to be applied to one input of AND gate 50.

Flip-flop circuit 49 is reset by a reset pulse (FIG. 15G) to retain the data of the H level at the rising (arrow) timing of the clock input (FIG. 15D). Therefore, the pulse (FIG. 15I) is output from flip-flop circuit 49 to be applied to the other input of AND gate 50.

As a result, a signal representing the AND (FIG. 15J) is obtained from AND circuit 50. This signal is applied to one shot circuit 51, whereby a pulse (FIG. 15K) having a duration longer than the time interval of the trailing edge of the two pulses of the signal (FIG. 15J) is generated from circuit 51. This pulse (FIG. 15K) is output as the signal indicating detection of an address mark.

According to the fourth embodiment of the present invention, an address mark can be detected reliably independent of the phase of the waveform of the address mark when the amplitude of the address mark is greater than that of the wobble.

Figure 16:
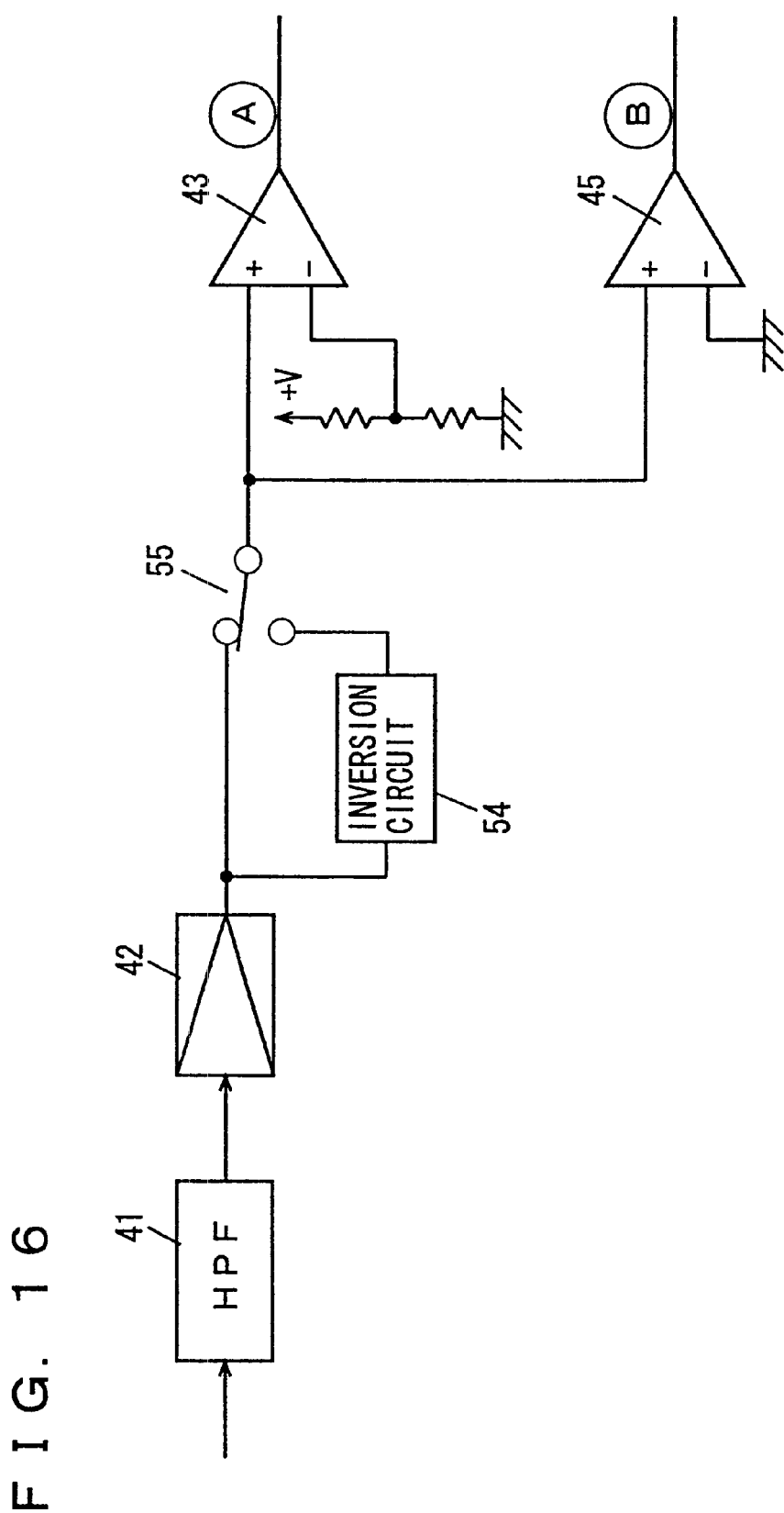
FIG. 16 is a block diagram showing a modification of the former stage portion of the address mark detection circuit of FIG. 12.

Comparators 43 and 44 of FIG. 12 can be used in common with one comparator by providing an inversion circuit 54 and a switch 55 as shown in FIG. 16 to switch the polarity towards the positive input of the comparator. Accordingly, the circuit configuration can be made more simple.

[Fifth Embodiment]

Figure 17:
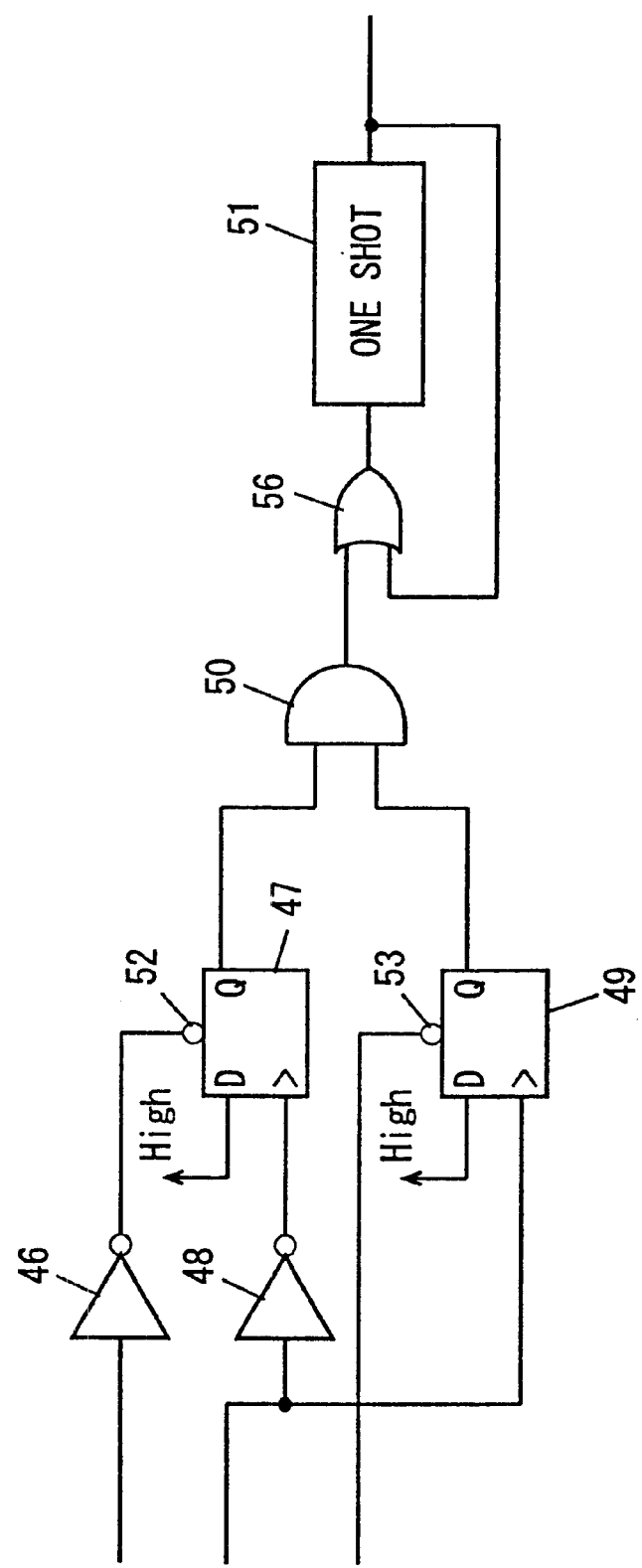
FIG. 17 is a block diagram showing the latter stage portion of the address mark detection circuit according to a fifth embodiment of the present invention.

FIG. 17 is a block diagram showing the structure of the latter stage of the address mark detection circuit according to a fifth embodiment of the present invention. The former stage portion is as shown in FIG. 12 or 16. The embodiment shown in FIG. 17 is directed to realize a detection circuit that will not detect a scratch erroneously as an address mark even when, for example, there is such a scratch between the address marks on the surface of a disk. The structure of the detection circuit differs from the structure of the fourth embodiment shown in FIG. 13 in that an OR gate 56 is provided to feed back the output of one shot circuit 51 to its input.

FIGS. 18A–18D are timing charts to describe the operation of the address mark detection circuit of FIG. 17.

Referring to FIGS. 17 and 18A–18D, when there is a physical scratch 3 in the groove between two address marks as shown in FIG. 18A, a pulse corresponding to this scratch is detected by flip-flop circuits 47 and 49. A pulse corresponding to the AND thereof is output from AND gate 50 (FIG. 18B). Here, the duration of the pulse generated by one shot circuit 51 is set longer than the duration $t_1$ of respective trailing edges ((a) and (b) of FIG. 18B) of the pulse corresponding to the amplitudes in the positive direction and the negative direction of the address mark in the previous fourth embodiment, and shorter than the duration $t_2$ starting from the position of elapse (b) of $t_1$ up to the trailing edge (d) of the pulse corresponding to the amplitude in the positive direction of the next address mark. By ORing that pulse and the output (FIG. 18B) of AND gate 50 by use of an OR gate 56, the pulse corresponding to scratch 3 will not be erroneously detected as a detection pulse of the address mark.

Preferably, the duration is set to a time interval close to time interval $t_2$. Also, the duration time ($t_1 < t < t_2$) under control of one shot circuit 51 can have the clock counted with a digital counter to set the time close to the time of ($t_1 + t_2$) of FIG. 18B.

According to the present fifth embodiment, the timing of an address mark can be detected correctly without being influenced by a scratch, if any, between the address marks on the surface of the disk.

I claim:

1. An information recording apparatus comprising:

a data record means unit (310, 330, 350) for recording disposed to record data to a mounted recording medium in response to a supplied control signal, an information read out means unit (230, 500) for reading disposed to read out information from said recording medium, a first period signal detection means circuit (130) for detecting disposed to detect a first period signal from read out said information, a synchronizing signal generation means circuit (170) for generating disposed to generate a plurality of synchronizing signals of different phases according to detected said first period signal, a second period signal detection means circuit (190) for detecting disposed to detect a second period signal from read out said information, and a control means circuit (210) for disposed to selectively supplying supply as said control signal to said data record means unit a synchronizing signal out of plurality of synchronizing signals generated by said synchronizing signal generation means circuit that has a predetermined phase difference from said second period signal detected by said second period signal detection means circuit.

* * * * *